United States Patent
Mehta

(10) Patent No.: US 10,719,065 B2
(45) Date of Patent: Jul. 21, 2020

(54) SYSTEM OF MONITORING AND CONTROLLING THE OPERATION OF MULTIPLE MACHINES FOR PRODUCING DIAMONDS AND A METHOD THEREOF

(71) Applicant: IIA TECHNOLOGIES PTE. LTD., Singapore (SG)

(72) Inventor: Vishal Jatin Mehta, Singapore (SG)

(73) Assignee: IIA TECHNOLOGIES PTE. LTD., Singapore (SG)

( * ) Notice: Subject to any disclaimer, the term of this patent is extended or adjusted under 35 U.S.C. 154(b) by 64 days.

(21) Appl. No.: 15/535,703

(22) PCT Filed: Nov. 17, 2015

(86) PCT No.: PCT/SG2015/000141
§ 371 (c)(1),
(2) Date: Jun. 13, 2017

(87) PCT Pub. No.: WO2016/099399
PCT Pub. Date: Jun. 23, 2016

(65) Prior Publication Data
US 2018/0046170 A1    Feb. 15, 2018

(30) Foreign Application Priority Data
Dec. 15, 2014 (SG) ............................ 10201408352X

(51) Int. Cl.
*G05B 19/418* (2006.01)
*G06F 21/31* (2013.01)
(Continued)

(52) U.S. Cl.
CPC ..... *G05B 19/41815* (2013.01); *G05B 19/418* (2013.01); *G05B 19/4185* (2013.01);
(Continued)

(58) Field of Classification Search
CPC ............ G05B 19/41815; G05B 19/418; G05B 19/4185; G05B 2219/23161;
(Continued)

(56) References Cited

U.S. PATENT DOCUMENTS

| 5,963,450 A | * | 10/1999 | Dew ................. G05B 19/4185 700/169 |
| 6,023,507 A | | 2/2000 | Wookey |

(Continued)

FOREIGN PATENT DOCUMENTS

CN    204331421 U   *   5/2015

OTHER PUBLICATIONS

International Search Report of International Application No. PCT/SG2015/000141 completed and dated Jan. 12, 2016 (3 pages).
(Continued)

*Primary Examiner* — Ali S Abyaneh
*Assistant Examiner* — Shu Chun Gao
(74) *Attorney, Agent, or Firm* — Kang S. Lim

(57) ABSTRACT

A system of monitoring and controlling an operation, comprising: an input means, the input means is adapted for user to input user-defined parameters, a middleware application in connection with the input means via a network, the middleware application is in communication with a directory database and also a relational database management system via communication means, a data management system being installed as a slave program in the middleware application and as a slave program in one more external server or external device, the middleware application is in communication with the external servers or device via communication means, whereby the master-slave relation allows exchange of data between the middleware application and the server architecture.

17 Claims, 4 Drawing Sheets

(51) Int. Cl.
*G06F 16/28* (2019.01)
*C30B 29/04* (2006.01)

(52) U.S. Cl.
CPC .............. *G06F 21/31* (2013.01); *C30B 29/04* (2013.01); *G05B 2219/23161* (2013.01); *G05B 2219/24155* (2013.01); *G05B 2219/31457* (2013.01); *G05B 2219/34263* (2013.01); *G06F 16/284* (2019.01); *Y02P 90/08* (2015.11); *Y02P 90/18* (2015.11)

(58) Field of Classification Search
CPC ........... G05B 2219/24155; G05B 2219/31457; G05B 2219/34263; G06F 21/31; G06F 17/30595; Y02P 90/18; Y02P 90/02; C30B 29/04
See application file for complete search history.

(56) References Cited

U.S. PATENT DOCUMENTS

| | | | | |
|---|---|---|---|---|
| 6,044,305 | A * | 3/2000 | Larson | G05B 19/4184 700/11 |
| 6,088,659 | A | 7/2000 | Kelley et al. | |
| 6,269,279 | B1 * | 7/2001 | Todate | G05B 19/41865 700/108 |
| 6,298,377 | B1 * | 10/2001 | Hartikainen | G05B 19/4185 709/223 |
| 6,460,141 | B1 | 10/2002 | Olden | |
| 6,788,980 | B1 * | 9/2004 | Johnson | G05B 19/042 700/1 |
| 6,850,497 | B1 * | 2/2005 | Sigler | H04B 7/1853 370/310 |
| 7,017,116 | B2 * | 3/2006 | Elsbree | G06F 8/38 715/740 |
| 7,486,495 | B1 * | 2/2009 | Diederichs | G05B 19/4185 340/870.07 |
| 7,587,481 | B1 * | 9/2009 | Osburn, III | G05B 19/4183 709/223 |
| 8,868,907 | B2 * | 10/2014 | Graham | H04L 9/32 380/44 |
| 9,786,197 | B2 * | 10/2017 | Asenjo | G09B 19/18 |
| 9,989,958 | B2 * | 6/2018 | Asenjo | G05B 19/4185 |
| 2003/0004686 | A1 * | 1/2003 | Ueno | G05B 19/0423 702/188 |
| 2005/0090937 | A1 * | 4/2005 | Moore | F03D 7/047 700/286 |
| 2006/0015195 | A1 * | 1/2006 | Lehman | G05B 19/0428 700/83 |
| 2007/0113276 | A1 | 5/2007 | Shoji et al. | |
| 2009/0198349 | A1 * | 8/2009 | Carpenter | G05B 23/0221 700/12 |
| 2012/0246376 | A1 * | 9/2012 | Kolblin | G05B 19/4185 710/305 |
| 2013/0046640 | A1 * | 2/2013 | Thierer | G06Q 30/02 705/14.69 |
| 2013/0178969 | A1 * | 7/2013 | Zanichelli | B65B 61/26 700/95 |
| 2013/0297868 | A1 | 11/2013 | Yin et al. | |
| 2014/0012616 | A1 * | 1/2014 | Moshenek | G06Q 10/063114 705/7.15 |
| 2014/0075392 | A1 * | 3/2014 | Timsjo | G05B 19/418 715/841 |
| 2014/0135972 | A1 * | 5/2014 | Galeb | B05C 11/1013 700/157 |
| 2014/0355412 | A1 * | 12/2014 | Romero Bueno | H04L 41/0695 370/217 |
| 2015/0344233 | A1 * | 12/2015 | Kleinikkink | G05B 19/00 700/230 |
| 2016/0072750 | A1 * | 3/2016 | Kass | H04L 51/14 709/206 |
| 2016/0098037 | A1 * | 4/2016 | Zornio | H04L 41/0803 700/20 |
| 2016/0099863 | A1 * | 4/2016 | Messinger | H04L 41/145 370/218 |
| 2016/0313727 | A1 * | 10/2016 | Chen | G05B 19/4185 |
| 2018/0224834 | A1 * | 8/2018 | Rischar | G05B 19/0421 |

OTHER PUBLICATIONS

Written Opinion of International Application No. PCT/SG2015/000141 dated Jan. 12, 2016 (7 pages).
Written Opinion of International Application No. PCT/SG2015/000141 dated Dec. 12, 2016 (5 pages).
International Preliminary Report on Patentability of International Application No. PCT/SG2015/000141 dated Mar. 1, 2017 (5 pages).

* cited by examiner

SYSTEM OF MONITORING AND CONTROLLING THE OPERATION OF MULTIPLE MACHINES FOR PRODUCING DIAMONDS AND A METHOD THEREOF

FIELD OF THE INVENTION

The invention relates to a system and method of monitoring and controlling the operation of multiple machines adapted for producing diamonds from a remote location.

BACKGROUND

Large-scale production of diamond has long been an objective of both research and industry. Diamond, in addition to its gem properties, is the hardest known material, has the highest known thermal conductivity, and is transparent to a wide variety of electromagnetic radiation. It is valuable because of its wide range of applications in a number of industries, in addition to its value as a gemstone. However, a diamond can have low fracture toughness that will make it unsuitable for many applications, such as high impact machine tools.

There exist many systems and methods with the objective of producing diamonds at a large scale. More specifically, an example of such a system and method of producing diamonds at a large scale is described as follows.

A machine is adapted to produce diamonds. To cope with the demand of the diamonds, the production rate of the diamonds has to be increased. The existing method makes use of multiple machines to increase the production rate of the diamonds. Each machine is provided with a Human Machine Interface (HMI) mounted thereto to allow user to control the operation of the production of diamonds therein.

A drawn back of the above described example is that the HMI is mounted onto each machine. The HMI is not portable. In addition, the HMI is costly too. In order to operate the multiple machines, the user has to go to each of the individual machines to operate the production of the diamonds via the HMI on the machine at every regular time interval. The user has to manually record the parametric values on a data sheet for every machine at the same time interval. It is submitted that the present method is tedious, error-prone, unproductive, inefficient and time consuming. In addition, manpower and labour cost goes up if there is a need to deploy more users to operate multiple machines for producing diamonds.

It is an objective of the present invention to provide a method and system of controlling the operation of the production of diamonds in multiple machines by using an input means from a remote location. The manpower and labour cost goes down as it is possible to have only one user to control the entire operation.

In addition, the security of operation of production of diamonds in multiple machines is also improved as only approved personnel can access the system. The system is also more user-friendly and thus facilitating new user to learn how to use the system faster and easier. In addition, the paperwork is significantly reduced as most of the work is now done electronically by the system. Furthermore, the system also allows the addition of new machines if the production rate needs to grow in view of increasing demand. The user's experience with the system is thus significantly enhanced since the user can have a better control of the system. It is submitted that the system improves the overall productivity and efficiency of the production of diamonds.

Other objects and advantages of the present invention will become apparent from the following description, taken in connection with the accompanying drawings, wherein, by way of illustration and example, an embodiment of the present invention is disclosed.

SUMMARY OF INVENTION

In accordance with a first aspect of the present invention, there is provided a system of monitoring and controlling an operation, comprising:
  an input means, the input means is adapted for user to input user-defined parameters,
  a middleware application in connection with the input means via a network, the middleware application, is in communication with a directory database and also a relational database management system via communication means,
  a data management system being installed as a slave program in the middleware application and as a slave program in one more external server or external device, the middleware application is in communication with the external servers or device via communication means, whereby the master-slave relation allows exchange of data between the middleware application and the server architecture.

In accordance with a second aspect of the present invention, there is provided a system of monitoring and controlling the operation of multiple machines, comprising:
  an input means, the input means is adapted for user to input user-defined parameters,
  a middleware application in connection with the input means via a network, the middleware application is in communication with a directory database and also a relational database management system via communication means,
  one or more server architectures, the middleware application is in communication with each of the serve architectures via communication means, each of the server architecture is further in communication with multiple machines via communication means,
  a data management system being installed as a slave program in the middleware application and as a slave program in one more server architectures, the middleware application is in communication with the server architectures via communication means, whereby the master-slave relation allows exchange of data between the middleware application and the server architecture.

In accordance with a third aspect of the present invention, there is provided a method of controlling the operation of multiple machines for producing diamonds at a normal access level, comprising:
  logging in into the system according to claims 1 to 19,
  verifying the authentication of the user's credential,
  gaining access to the system if the authentication result is positive,
  starting the system,
  keying in user-defined parameters on the input device to control the operation of the machines,
  transmitting the parameters from the input device to the middleware application,
  transmitting the parameters from the middleware application to the server architecture via a slave-master relation established from the slave program installed in the middleware and the master program installed in the server architecture, transmitting the parameters from the master program to the OPC (Open Process Control) server in the server architecture, transmitting the parameters from the server architecture to the machine.

In accordance with a fourth aspect of the present invention, there is provided a method of gaining special access to the system, comprising:

logging in into the system according to claims 1 to 19 via a third computing device, verifying the authentication of the user's credential, gaining access to the system if the authentication result is positive, starting the system, keying in user-defined parameters on the SCADA client, transmitting the parameters from the SCADA client to the third party computing device and then to the machines via the OPC (Open Process Control) server in the server architecture, transmitting the data from the machine to the third party device via the OPC (Open Process Control) server.

In accordance with a fifth aspect of the present invention, there is provided a method of enhancing the security of the system according to claims 1 to 19, comprising:

launching the application software on the input device, launching the login screen by the application software, entering the log in details of the user, saving the log in details of the user if the log in is successful, accessing the application software by the user, launching the control panel, keying in user-defined parameters to on the input device to control the operation of the machines, locking the screen if the user is not actively using the application software, prompting the user to re-enter the password up to 3 attempts, launching the control panel if successful and relaunching the login in screen if unsuccessful.

In accordance with a sixth aspect of the present invention, there is provided a method of enhancing the security of the system according to claims 1 to 19, comprising:

launching the application software on the input device, launching the login screen by, the application software, entering the log in details of the user, saving the log in details of the user if the log in is successful, accessing the application software by the user, launching the control panel, keying in user-defined parameters to on the input device to control the operation of the machines, locking the screen if the user is not actively using the application software, prompting the user to re-enter the log in details, launching the control panel if successful.

BRIEF DESCRIPTION OF DRAWINGS

This then generally describes the invention but to assist with understanding reference will now be made to the accompanying drawings which show preferred embodiments of the invention.

DETAILED DESCRIPTION

Figure 1:
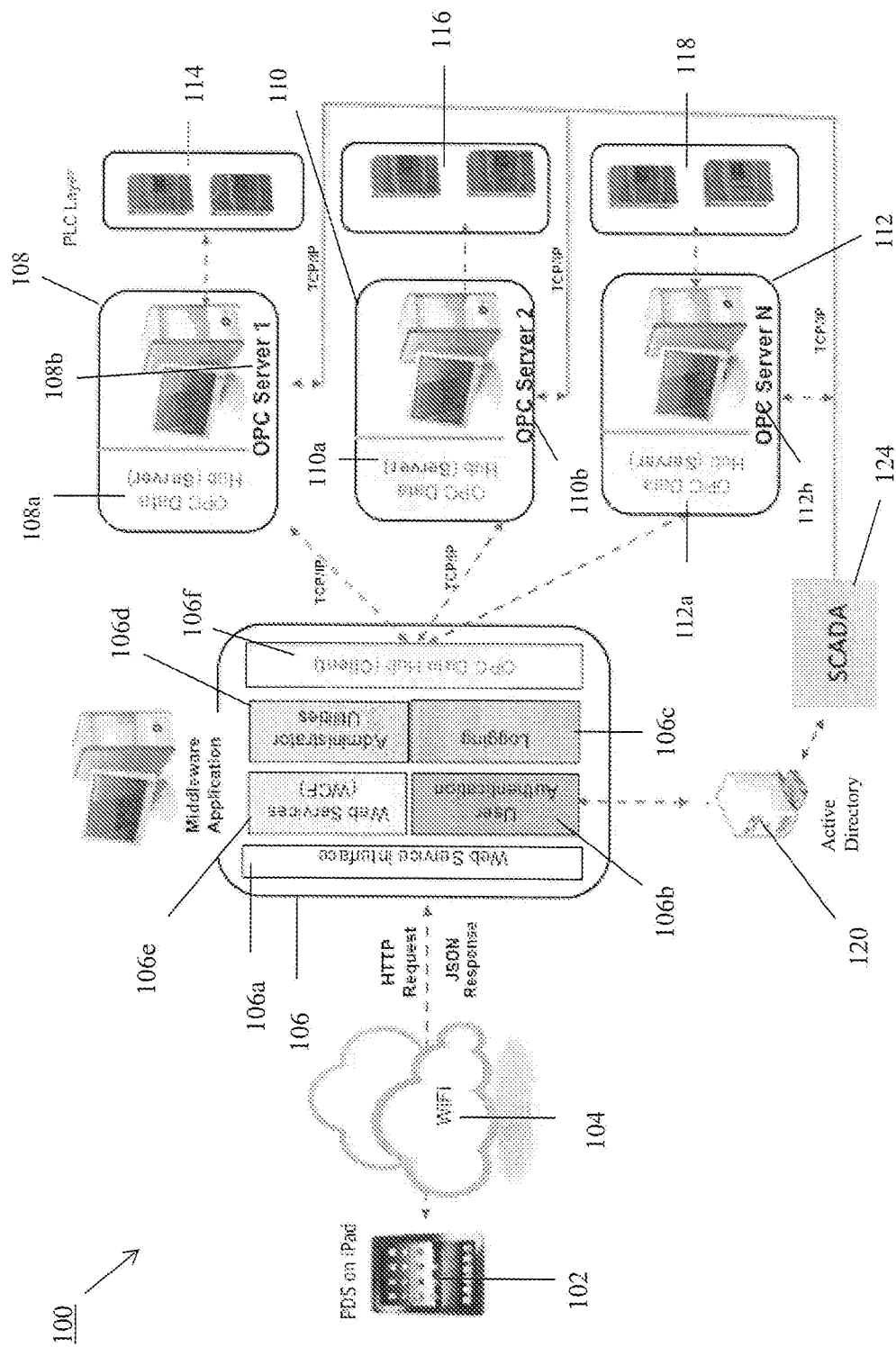
FIG. 1 shows the system of controlling the operation of multiple machines adapted for producing diamonds using a tablet computer from a remote location according to a preferred embodiment of the present invention.

The Figures are diagrammatic and not drawn to scale. In the Figures, elements which correspond to elements already described have the same reference numerals.

According to a first aspect of the present invention, there is provided a system of monitoring and controlling an operation using an input means, the input means is adapted for user to input user-defined parameters. The system comprises of an input means for allowing user to input user-defined parameters. Furthermore, the system also comprises a middleware application which is in connection with the input means via a network. A data management system is also provided to be installed as a slave program in the middleware application and as a master program in one or more external servers or external devices. The master-slave relation allows exchange of data between the middleware application and the external server(s) or external device(s). Beside in connection with the input means and in communication with one or more external servers or external devices, the middleware application is in further communication with a directory database and also a relational database management system.

In a preferred embodiment of the present invention as shown in FIG. 1, there is provided a system 100 of monitoring and controlling an operation using an input means 102 from a remote location, the input means is adapted for user to input user-defined parameters. The input means includes a input device 102 provided with an user interface and a suitable platform is installed therein in order for the input device 102 to be functional.

The system 100 comprises a middleware application 106 which is in connection with the input device 102 via a network 104.

The input device 102 may be in the form of tablet computer having a suitable platform installed therein in order for the input device 102 to be functional. The tablet computer may be an Apple iPAD or other suitable type of tablet computers. In other embodiment, the input means may be in the form of website.

The input device 102 can transmit commands signals to the service-oriented architecture 106e in the form of web service (WCF) via a network by means of JavaScript Object Notation (JSON) sent over Hypertext Transfer Protocol (http) and is also able to process the response sent by the web service (WCF) 106e. The network 104 is either a wired network or a wireless network. Wireless network may be a WI-FI in a preferred embodiment of the present invention.

The middleware application 106 is also provided with a web service interface 106a adapted to provide contact point between the service-oriented architecture 106e and the input device 102.

The middleware application 106 comprises of a storage medium for storing administrative utilities information 106d and a service-oriented architecture 106e in the form of WCF service (Windows Communication Foundation)

The service-oriented architecture 106e is adapted to support distributed computing where services have remote consumers. For instance, the WCF service 106e processes user authentication 106b and also logging 106c. In addition, the WCF service 106e also facilitates data communication between the input device 102 and the external server(s) or external device(s). The WCF service 106e also retrieves special permission or messages from the Windows AppFabric Cache 106h (see FIG. 2) and transmits it to the input device 102. The WCF service 106e also provides information to the administrative utilities portal 106d.

An administration portal or also known as administrative utilities portal 106d is provided for administration purpose. For instance, the administration portal 106d enables an administrator to terminate a user session. The administrator has the power to assign access right to those operating the system 100. Other administration tasks include setting up temporary access right, setting up message for user of input device application. The administration portal 106d may be a web based portal so that the administrator can access the portal as long as there is a network connection.

The data management system is installed as a slave program 106f (also known as OPC. Datahub (client) or just simply client) in the middleware application 106 and as a master program (108a, 110a, 112a) (also known as OPC Datahub (server) or just simply server) in an external server or external device. The master-slave relation allows exchange of data between the middleware application 106 and the external server(s) or external device(s). Data management system may be created by Cogent Datahub or some other suitable manufacturer.

In this system, in order to establish the slave-master connection, the tunnelling means in the form of a socket based Transmission Control Protocol (TCP/IP) is established between OPC Data Hub (server) (also known as master program) (108a, 110a, 112a) and the OPC Data Hub (client) (also known as slave program) 106f which replicates any data change occurring at one end immediately at the other end.

In this system, there can be only one slave program per service instance but there can be multiple master programs. Each master program facilitates the data communication between the OPC datahub server to which it is connected and the slave program 106f. The slave program 106f connects only to the master program (108a, 110a, 112a) and propagates this information to the user via the input device 102.

According to a second aspect of the present invention as shown in FIG. 1, there is provided a system of monitoring and controlling an operation of one or more machines using an input means from a remote location, the input means is adapted for user to input user-defined parameters. The system comprises of an input means for allowing user to input user-defined parameters. Furthermore, the system also comprises a middleware application which is in connection with the input means via a network. The system also comprises one or more server architectures adapted for transmitting parameters to the machines. The middleware application is in communication with each of the server architectures via communication means. Each of the server architectures are in communication with the machines via communication means. A data management system is also provided to be installed as a slave program in the middleware application and as a master program in each of the server architectures. The master-slave relation allows exchange of data between the middleware application and the server architectures. Beside in connection with the input means and in communication with one or more server architectures, the middleware application is in further communication with a directory database and a relational database management system.

In the preferred embodiment of the present invention as shown in FIG. 1, the system 100 of operating one or more machines (114, 116, 118) using an input means from a remote location, the input means is adapted for user to input user-defined parameters. Each machine (114, 116, 118) may be adapted to produce diamonds therein. The input means includes input device 102 provided with an user interface and a suitable platform is installed therein in order for the input device 102 to be functional.

The system 100 comprises a middleware application 106 which is in connection with the input device 102 via a network 104.

The input device 102 may be in the form of tablet computer having a suitable platform installed therein in order for the input device 102 to be functional. The tablet computer may be an Apple iPAD or other suitable type of tablet computers. In other embodiments, the input means may be in the form of website.

The input device 102 can transmit commands signals to the service-oriented architecture 106e in the form of web service (WCF) via a network by means of JavaScript Object Notation (JSON) sent over Hypertext Transfer Protocol (http) and is also able to process the response sent by the web service (WCF) 106e. The network 104 is either a wired network or a wireless network. Wireless network may be a WI-FI in a preferred embodiment of the present invention.

The middleware application 106 is also provided with a web service interface 106a adapted to provide contact point between the service-oriented architecture 106e and the input device 102.

The middleware application 106 comprises of a storage medium for storing administrative utilities information 106d and a service-oriented architecture 106e in the form of WCF service (Windows Communication Foundation).

The service-oriented architecture 106e is adapted to support distributed computing where services have remote consumers. For instance, the WCF service 106e processes user authentication 106b and also logging 106c. In addition, the WCF service 106e also facilitates data communication between the input device 102 and the OPC servers (108b, 110b, 112b). The WCF service 106e also retrieves special permission or messages from the Windows AppFabric Cache 106h (see FIG. 2) and transmits it to the input device 102. The WCF service 106e also provides information to the administrative utilities portal 106d.

An administration portal or also known as administrative utilities portal 106d is provided for administration purpose. For instance, the administration portal enables an administrator to terminate a user session. The administrator has the power to assign access right to those operating the system 100. Other administration tasks include setting up temporary access right, setting up message for user of input device application. The administration portal 106d may be a web based portal so that the administrator can access the portal as long as there is a network connection.

The data management system is installed as a slave program 106f (also known as OPC Datahub client or just simply client) in the middleware application 106 and as a master program (108a, 110a, 112a) (also known as OPC Datahub server or just simply server) in the server architecture (108, 110, 112). The master-slave relation allows exchange of data between the middleware application 106 and the server architecture (108, 110, 112). Data management system may be created by Cogent Datahub or some other suitable manufacturer.

In this system, in order to establish the slave-master connection, the tunneling means in the form of a socket based Transmission Control Protocol (TCP/IP) is established between OPC Data Hub (server) (also known as master program) (108a, 110a, 112a) and OPC Data Hub (client) (also known as slave program) 106f which replicates any data change occurring at one end immediately at the other end.

In this system, there can be only one slave program per service instance but there can be multiple master programs. Each master program facilitates the data communication between the OPC datahub server to which it is connected and the slave program 106f. The slave program 106f connects only to the master program (108a, 110a, 112a) and propagates this information to the user via the first input means 102.

The system 100 is provided with one or more server architectures (108, 110, 112) adapted for transmitting parameters to the machines (114, 116, 118). The middleware application 106 is in communication with each of the server architectures (108, 110, 112) via communication means. Each of the server architectures (108, 110, 112) are in communication with the machines (114, 116, 118) via communication means. The communication means may be in the form of TCP/IP.

The server architectures (108, 110, 112) comprise of OPC (Open Process Control) server (108b, 110b, 112b) and also master program (108a, 110a, 112a). Each of the server architectures (108, 110, 112) is installed within a computing device and also is in communication with one or more machines (114, 116, 118) via a communication means. The communication means may be in the form of TCP/IP. The OPC server is known as OLE (object linking and embedding) for process control. It is submitted that the number of machines per server architecture may be 36 or 72 for optimum performance.

The system 100 also provided with a special access. As shown in FIG. 1, the third party computing device 124 is installed with industrial control system in the form of SCADA application (supervisory control and data acquisition). Industrial control systems are program logic controlled (PLC) systems that monitor and control industrial processes that exist in the physical world.

The SCADA application installed in the third party computing device 124 is able to process user authentication and also logging. The SCADA application is adapted to verify if the user who log in into the SCADA application is in the active directory's list 120 and if so, the user will be identified to be an approved personnel. If the user is identified to be an approved personnel, the SCADA application will be accessible by the user. In addition, the SCADA application is able to perform data monitoring, data logging, data control and visualization. In a special access, the user will key in user-defined parameters on the SCADA client. The parameters will be transmitted from the SCADA client to the third party computing device 124 and then to the machine (114, 116, 118) via the OPC server (108b, 110b, 112b). At the same time, the user can also monitor the status of the machine (114, 116, 118) when the data from the machines (114, 116, 118) is transmitted back to the third party computing device 124 via the OPC server (108b, 110b, 112b).

The third party computing device 124 is in direct communication with both of the OPC servers (108b, 110b, 112b) and the active directory 124 via a communication means. The communication means may be in the form of TCP/IP.

Unlike the normal access (see FIG. 3), the special access enables direct data communication between the third party computing device 124 and the OPC server (108b, 110b, 112b).

Figure 2:
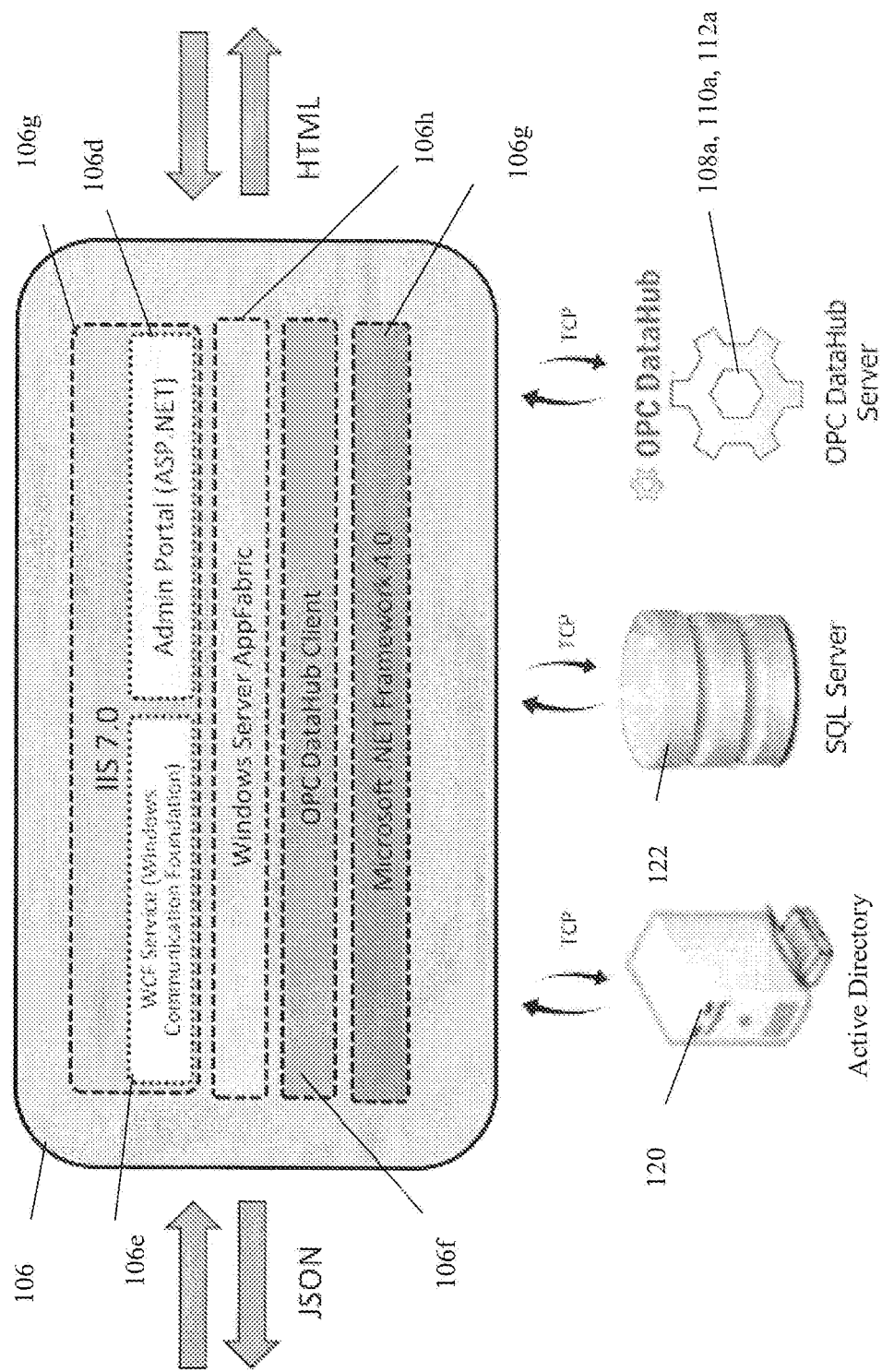
FIG. 2 shows the components within the middleware application and how they co-operate with other components according to a preferred embodiment of the present invention.

FIG. 2 shows the components within the middleware application 106 according to a preferred embodiment of the present invention.

As shown in FIG. 2, the service-oriented architecture in the form of web services (WCF) 106e and the administrator portal 106d (also known as administrator utilities in FIG. 1) may be hosted in a hosting platform, such as Internet Information System (IIS) 7.0 running on a Microsoft Windows 2008 R2. The middleware application 106 is further installed with a caching provider and a monitoring service 106h, a data management system (DMS) 106f and a software framework 106g.

The caching provider and the monitoring service 106h is in the form of Windows Server AppFabric adapted to build, scale and manage web and composite applications that run on Internet Information System (IIS). It is an extension to the middleware application 106 role of the Windows Server, and any application is free to use its parts separately or together.

In this system 100, Windows Server AppFabric 106h improve the performance by providing a distributed caching mechanism to store frequently used data. Furthermore, Windows Server AppFabric 106h is also used as a temporary repository to store special permissions and messages. These special permissions and messages will then be transmitted from the SQL Server database 122 to the Windows Server AppFabric 106h when time elapses so that the tablet computer application can pick up this information when it polls the WCF service 106e every second. If the cache is not there, then it requires a database to hit every second to retrieve this information.

The data management system is installed as a slave program 106f (also known as OPC Datahub (client) or just simply client) in the middleware application 106 and as a master program (108a, 110a, 112a) (also known as OPC Datahub (server) or just simply server) in the server architecture (108, 110, 112). The master-slave relation allows exchange of data between the middleware application 106 and the server architecture (108, 110, 112). Data management system may be created by Cogent Datahub or some other suitable manufacturer.

In this system, in order to establish the slave-master connection, the tunneling means in the form of a socket based Transmission Control Protocol (TCP/IP) is established between OPC Data Hub (server) (also known as master program) (108a, 110a, 112a) and OPC Data Hub (client) (also known as slave program) 106f which replicates any data change occurring at one end immediately at the other end.

In this system, there can be only one slave program per service instance but there can be multiple master programs. Each master program facilitates the data communication between the OPC server to which it is connected and the slave program 106f. The slave program 106f connects only to the master program (108a, 110a, 112a) and propagates this information to the user via the input device 102.

The software framework 106g is in the form of Microsoft .NET Framework 4.0. It includes a large library and provides language interoperability (each language can use code written in other languages) across several programming languages. Programs written for the .NET Framework execute in a software environment (as contrasted to hardware environment), known as the Common Language Runtime (CLR), an application virtual machine that provides services such as security, memory management, and exception handling. The class library and the CLR together constitute the .NET Framework. The .NET Framework's Base Class Library provides user interface, data access, database connectivity, cryptography, web application development, numeric algorithms, and network communications. Programmers produce software by combining their own source code with the .NET Framework and other libraries. The .NET Framework is intended to be used by most new applications created for the Windows platform. Microsoft also produces an integrated development environment largely for .NET software called Visual Studio.

As shown in FIG. 2, middleware application 106 is in communication with a directory database 120 and a relational database management system 122 according to an aspect of the present invention. The directory database 120 is also known as active directory adapted to store the information relating to the credential of approved personnel (both supervisor and operator).

The middleware application 106 is able to verify if the user who log in into the system 100 is an approved personnel by tallying with the records in the active directory 120. If the user is identified to be an approved personnel, the system 100 will be accessible by the user.

The relational database management system is in the form of Microsoft SQL server 122 adapted to store data such as logs, special permissions, messages and various configurations. As a database, it is a software product whose primary function is to store and retrieve data as requested by other software applications, be it those on the same computer or those running on another computer across a network (including the Internet). There are at least a dozen different editions of Microsoft SQL Server aimed at different audiences and for different workloads (ranging from small applications that store and retrieve data on the same computer, to millions of users and computers that access huge amounts of data from the Internet at the same time). Its primary query languages are T-SQL and ANSI SQL.

The system 100 has additional features such as messaging and temporary permission which can be set up using a web based administration portal 106d. This information is saved in the SQL database 122. A windows service running in the background will pick up the new permission/messages and will place them in the AppFabric Cache 106h from where these will be picked up by the web services (WCF) 106e and then passed on to the input device 102 based on the user who is logged in.

Figure 3:
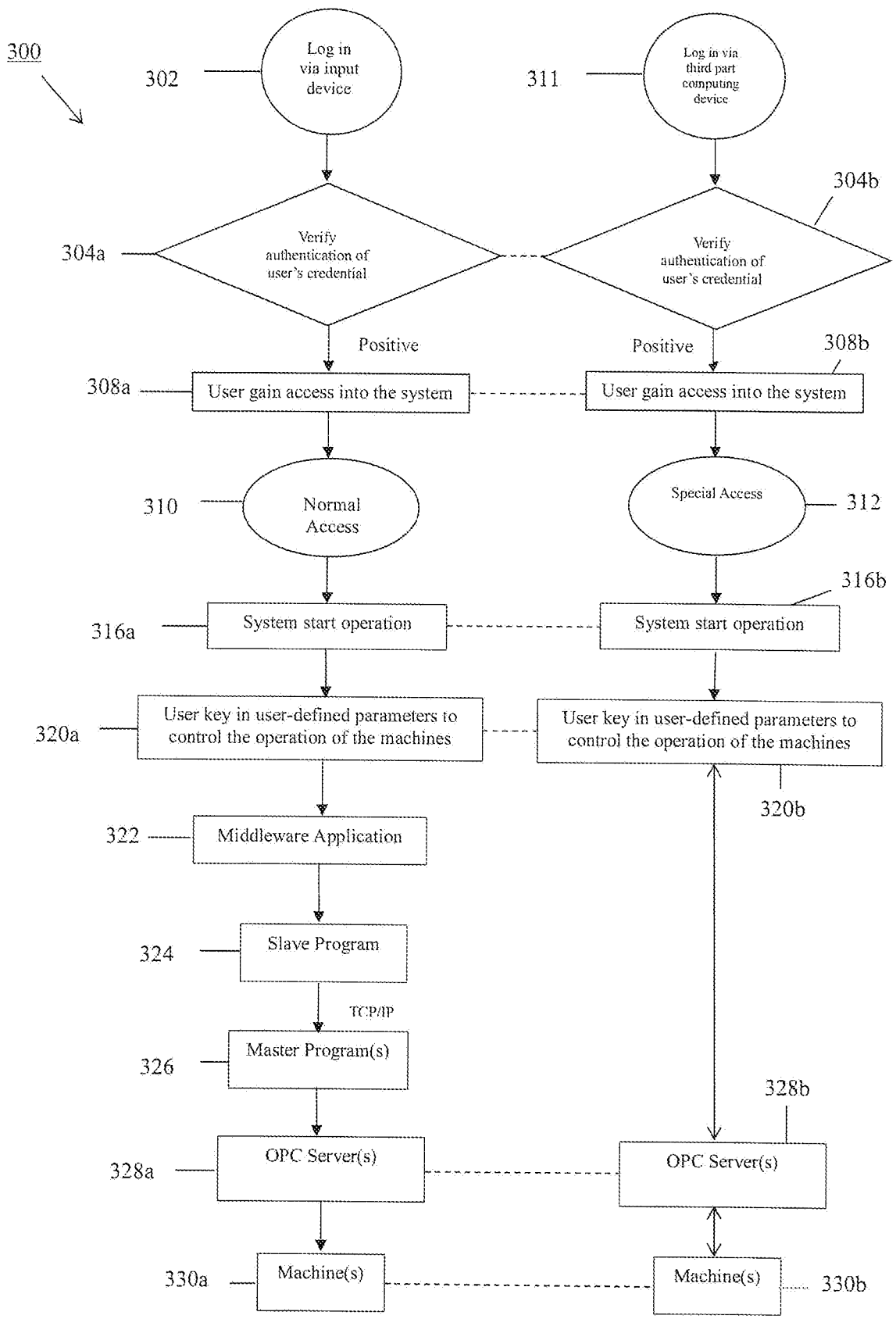
FIG. 3 shows the flow chart of controlling the operation of multiple machines adapted for producing diamonds using a tablet computer from a remote location according to a preferred embodiment of the present invention.

FIG. 3 shows the flow chart 300 of controlling the operation of the machines according to a preferred embodiment of the present invention.

According to a third aspect of the present invention, to start operating the system, the user first log in into the system 100 using the input device at step 302.

At step 304a, the service oriented architecture in the form of web service (WCF) 106e will process the authentication of the user's credential. The authentication is done by cross-checking the user credential against the active directory 120.

If the authentication result is negative, the user is denied access into the system 100. If the authentication result is positive, the user gains access into the system 100 at step 308a to start the operation. Every successful log in attempt and user activity will be recorded in a storage medium in the middleware application 106. Every user session will be terminated after a pre-configured duration of usage for security reasons. This is to prevent any unauthorised use of the system if the user forgets to log out of the system. In case if the session is terminated under such circumstances, the user is notified immediately so that the user can log into the system again. The security of the system will be described more in detail in FIG. 4.

In a normal access 310, the operation starts at step 316a. In order to operate the machines (114, 116, 118), the user will key in user-defined parameters onto the interface of the input device 102 at step 320a. At the same time, the user can also monitor the status of the machine (114, 116, 118) when the data from the machines (114, 116, 118) is transmitted back to the input device 102.

At step 322, the parameters are transmitted from the input device 102 to the middleware application 106.

The slave program 106f installed in the middleware application 106 and the master program (108a, 110a, 112a) installed in the server architecture (108, 110, 112) establishes a slave-master relation which enables the parameters to be transmitted from the middleware application 106 to the OPC server (108b, 110b, 112b) at step 328a via steps 324 and 326 consecutively.

The parameters are then transmitted to the machine (114, 116, 118) at step 330a so as to operate the machine (114, 116, 118) according the configuration defined by the user-defined parameters.

According to another embodiment of the present invention, a special access to the system 100 is provided for the user. As shown in FIG. 1, the third party computing device 124 at step 311 is installed with industrial control system in the form of SCADA application (supervisory control and data acquisition). Industrial control systems are program logic controlled (PLC) systems that monitor and control industrial processes that exist in the physical world.

The SCADA application installed in the third party computing device 124 is able to process user authentication and also logging. The SCADA application is adapted to verify if the user who log in into the SCADA application is in the active directory's list 120 at step 304b and if so, the user will be identified to be an approved personnel. If the user is identified to be an approved personnel, the SCADA application will be accessible by the user at step 308b and 312, after which the operation will start at step 316b. In addition, the SCADA application is able to perform data monitoring, data logging, data control and visualization. In a special access, the user will key in user-defined parameters on the SCADA client at step 320b. The parameters will be transmitted from the SCADA client to the third party computing device 124 and then to the machine (114, 116, 118) via the OPC server (108b, 110b, 112b) at steps 328b and 330b. At the same time, the user can also monitor the status of the machine (114, 116, 118) when the data from the machines (114, 116, 118) is transmitted back to the third party computing device 124 via the OPC server (108b, 110b, 112b).

The third party computing device 124 is in direct communication with both of the OPC servers (108b, 110b, 112b) and the active directory 120 via a communication means. The communication means may be in the form of TCP/IP.

Unlike the normal access, the special access enables direct data communication between the third party computing device 124 and the OPC server (108b; 110b, 112b) from step 320b to step 328b.

Figure 4:
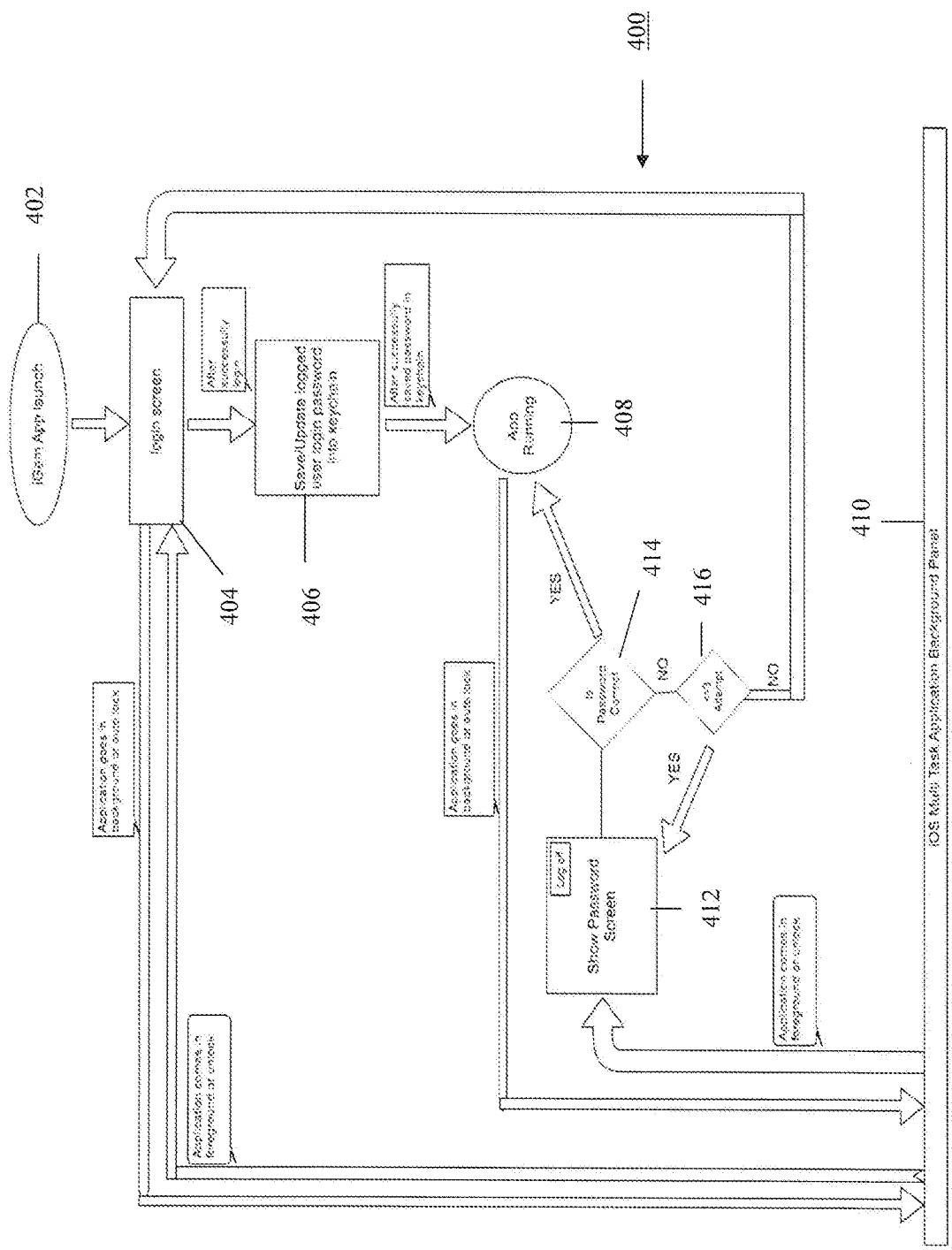
FIG. 4 shows the security of the system in accordance to a preferred embodiment of the present invention.

FIG. 4 shows the security of the system 400 in accordance to a preferred embodiment of the present invention.

In accordance with a fourth aspect of the present invention, an application software in the form of iGem App which is pre-installed in an input device is launched at step 402 when the user switch on the input device.

At step 404, the application software will launch a login screen for the user to enter the log in details.

If the log in is successful, the details of the log in details of the user is saved at step 406.

At step 408, the application software is run and accessible by the user.

The control panel in the form of iSO multi task application background panel will be launched at step 410 whereby the user can key in parameters to control the operation of the machine. The steps of controlling the operation of the machine have been earlier described in FIG. 3.

When the user is not actively using the iSO multi task application background panel, the screen will be automatically locked for security purpose.

At step 412, a screen showing the entry of password will be shown to prompt the user to re-enter the password to re-log into the system. If the password is correct, the application software is relaunched at step 408. If the password is incorrect at step 414, the system will prompt the user to re-enter the password up to 3 attempts at step 416. If the user is still unsuccessful after 3 attempts, the login screen will be relaunched at step 404 whereby the user is required to re-enter the entire log in details again.

The system can also be configured such that if when the user is not actively using the iSO multi task application background panel, the screen will be automatically locked for security purpose. The log in screen will be relaunched again at step 404 whereby the user is required to re-enter the entire log in details again.

It is apparent to a person skilled in the art that many modifications, alternatives and variations may be made to the preferred embodiment of the present invention as described above without departing from the spirit and scope of the present invention. Accordingly, it is intended to embrace all such modifications, alternatives and variations that fall within the scope of the included claims.

What is claimed is:

1. A system of monitoring and controlling an operation of multiple machines adapted for producing diamonds from a remote location, comprising:
    an input circuitry for user to input user-defined parameters,
    a middleware application in connection with the input circuitry, the middleware application is in communication with a directory database and a relational database management system,
    a data management system in a master-slave relation being installed as a slave program in the middleware application and as a master program in more than one external servers, the middleware application is in communication with the external servers, whereby the master-slave relation allows exchange of data between the middleware application and the external servers;
    wherein each of the external servers is operatively coupled to a diamond producing machine such that the external servers control the diamond producing machine in accordance with instructions received from the input circuitry.

2. The system according to claim 1, wherein the input circuitry includes a user interface and a platform installed therein in order for the input circuitry to be functional.

3. The system according to claim 2, wherein the input circuitry includes a tablet computer having a platform installed therein in order of the input circuitry to be functional.

4. The system according to claim 1, wherein the middleware application comprises of a storage medium for storing administrative utilities and a service-oriented architecture, the administrative utilities is adapted for administration purpose and the service-oriented architecture is adapted to support distributed computing where services have remote consumers, wherein the service-oriented architecture and the administrative utilities are hosted in a hosting platform, which includes an extensible web server.

5. The system according to claim 4, wherein the middleware application further comprises of a caching and a monitoring service and a software framework.

6. The system according to claim 5, wherein the caching and monitoring service is adapted to build, scale and manage web and composite applications that run on the extensible web server.

7. The system according to claim 1, wherein a network is a wireless network.

8. The system according to claim 1, wherein a communication means comprises TCP/IP.

9. The system according to claim 1, further comprise of one or more additional features including messaging and temporary permission which are set up using a web based administration portal.

10. The system according to claim 1, wherein the relational database management system is an SQL server adapted to store data that represents items of information selected from a group consisting essentially of: logs, special permissions, messages and configurations.

11. The system according to claim 1, wherein the middleware application is provided with a web service interface adapted to provide contact point between the external servers and the input circuitry.

12. A system of monitoring and controlling the operation of multiple machines adapted for producing diamonds from a remote location, comprising:
    an input circuitry for user to input user-defined parameters,
    a middleware application in connection with the input circuitry, the middleware application is in communication with a directory database and a relational database management system,
    one or more server architectures, the middleware application is in communication with each of the server architectures, each of the server architecture is further in communication with multiple diamond producing machines such that the server architectures control the diamond producing machines in accordance with instructions received from the input circuitry,
    a data management system in a master-slave relation being installed as a slave program in the middleware application and as a master program in one or more server architectures, the middleware application is in communication with the server architectures, whereby the master-slave relation allows exchange of data between the middleware master-slave relation allows exchange of data between the middleware application and the server architectures.

13. The system according to claim 12, wherein the server architecture is installed with a computing device.

14. A method of controlling operation of multiple machines for producing diamonds at a normal access level, comprising: logging in into a system of monitoring and controlling the operation of multiple machines adapted for producing diamonds from a remote location comprising a middleware application in connection with an input circuitry, the middleware application is in communication with a directory database and also a relational database management system, and a data management system in a master-slave relation being installed as a slave program in the middleware application and as a master program in more than one external servers, the middleware application is in communication with the external servers, whereby the master-slave relation allows exchange of data between the middleware application and the external servers, verifying authentication of a user's credential, gaining access to the system when the authentication result is positive, starting the system, keying in user-defined parameters on the input circuitry to control operation of the external servers, transmitting the parameters from the input circuitry to the middleware application, transmitting the parameters from the middleware application to a server architecture via the slave-master relation established from the slave program installed in the middleware application and the master program installed in the server architecture, transmitting the parameters from the master program to an Open Process Control (OPC) server in the server architecture, transmitting the parameters from the server architecture to the external servers.

15. A method of gaining special access to a system of monitoring and controlling operation of multiple machines adapted for producing diamonds from a remote location comprising a middleware application in connection with an input circuitry, the middleware application is in communication with a directory database and a relational database management system, and a data management system in a master-slave relation being installed as a slave program in the middleware application and as a master program in more than one external servers, the middleware application is in communication with the external servers, whereby the master-slave relation allows exchange of data between the middleware application and the external servers, comprising: logging in into the system via a third computing device, verifying an authentication of a user's credential, gaining access to the system when the authentication result is positive, starting the system, keying in user-defined parameters on a Supervisory Control and Data Acquisition (SCADA) client, transmitting the parameters from the SCADA client to a third party computing device and then to the machines for producing diamonds via Open Process Control (OPC) server in the server architecture, transmitting data from the machine to the third party computing device via the OPC server.

16. A method of enhancing security of a system of monitoring and controlling an operation of multiple machines adapted for producing diamonds from a remote location comprising a middleware application in connection with an input circuitry, the middleware application is in communication with a directory database and a relational database management system, and a data management system in a master-slave relation being installed as a slave program in the middleware application and as a master program in more than one external servers, the middleware application is in communication with the external servers, whereby the master-slave relation allows exchange of data between the middleware application and the external servers, comprising: launching application software on the input circuitry, launching a login screen by the application software, entering log in details of a user, saving the log in details of the user when authentication of the user using the log in details is successful, accessing the application software by the user, launching a control panel, keying in user-defined parameters to on the input circuitry to control operation of the diamond producing machines, locking a screen of the input circuitry
    when the user is not actively using the application software, prompting the user to re-enter at least a portion of the log in details up to three attempts, launching the control panel when the user is successfully authenticated in response to the prompting and relaunching the login in screen when the user fails to be authenticated in response to the prompting.

17. A method of enhancing security of a system of monitoring and controlling an operation of multiple machines adapted for producing diamonds from a remote location comprising a middleware application in connection with an input circuitry, the middleware application is in communication with a directory database and a relational database management system, and a data management system in a master-slave relation being installed as a slave program in the middleware application and as a master program in more than one external servers, the middleware application is in communication with the external servers, whereby the master-slave relation allows exchange of data between the middleware application and the external servers, comprising: launching application software on the input circuitry, launching a login screen by the application software, entering log in details of the user, saving the log in details of the user when the log in details are successful, accessing the application software by the user, launching a control panel, keying in user-defined parameters to on the input circuitry to control operation of the diamond producing machines, locking a screen of the input circuitry when the user is not actively using the application software, prompting the user to re-enter the log in details, launching the control panel when the user is successfully authenticated in response to the prompting.

* * * * *